Jan. 27, 1942.  R. HOFMANN ET AL  2,271,074
REMOVAL OF CELLULOSE ESTERS FROM PRECIPITATION VESSELS
Filed March 22, 1939

Rudolf Hofmann
Hans Maule
INVENTORS

Cleveland B. Hollabaugh
ATTORNEY

Patented Jan. 27, 1942

2,271,074

UNITED STATES PATENT OFFICE 2,271,074

REMOVAL OF CELLULOSE ESTERS FROM PRECIPITATION VESSELS

Rudolf Hofmann and Hans Mank, Dormagen, Germany, assignors to Hercules Powder Company, Wilmington, Del., a corporation of Delaware Application March 22, 1939, Serial No. 263,462
In Germany March 24, 1938

6 Claims. (Cl. 83—94)

This invention relates to a method for emptying containers or vessels, more particularly to a method for removing from containers solid particles or lumps admixed with a relatively small quantity of liquid. It also relates to apparatus for carrying out this method.

The discharge of a solid from a vessel in which it is in contact with a liquid is a problem frequently met with in the chemical industry. For example, in the precipitation of cellulose derivatives, as cellulose acetate, cellulose acetobutyrate, cellulose acetopropionate, cellulose proptionate, cellulose formate, cellulose butyrate, cellulose acetostearate, cellulose nitroacetate, ethyl cellulose, benzyl cellulose, etc., a non-solvent liquid is added to a solution of the cellulose derivative until a point is reached at which the entire liquid present becomes a non-solvent for the cellulose derivative. At this point, the cellulose derivative is precipitated in the form of pieces or lumps varying considerably in size from small pieces to lumps 25 or more centimeters in size, admixed with a relatively small volume of free liquid, little more than enough to cover the mass. It is essential to economical recovery of the solvent, usually acetic acid in the case of cellulose acetate for example, to add as little non-solvent such as water, for example as possible in bringing about precipitation.

Where the solid consists of small particles which are readily kept in suspension by the liquid, or where the quantity of liquid is very large relative to the solid, the solid is readily swept out by the liquid to a separator. However, in the case of precipitated cellulose derivatives as hereinabove mentioned, the solid is in the form of relatively large lumps or pieces, whose density is higher than that of the liquid so that the solid tends to settle, and the volume of the liquid is not considerably larger than that of the solid. Thus mechanical discharge of the solid from the vessel is difficult, or impossible. Where it is impossible or uneconomical to flush out the solid by the addition of considerable liquid as in the case of precipitated cellulose acetate mixtures containing valuable spent liquors, it has been necessary to drain off the liquid and remove the solid by hand, which is inconvenient and expensive.

The object of this invention is to provide a method of removing from a vessel lumps or pieces of precipitated cellulose derivatives such as cellulose acetate or other solid materials contained in a relatively small quantity of liquid which is of a lower density than the solid without dilution of the liquid or addition of liquid in a simple and expedient manner. It is a further object also to separate the solid pieces and lumps from the liquid in the same single operation.

These objects are accomplished according to this invention by discharging the precipitated derivative or other solid and liquid together continuously from the vessel, separating the liquid from the solid and returning the liquid to the vessel. Where the lumps of the solid, for example precipitated cellulose derivatives such as cellulose acetate, are so large as to interfere with the conveyance of the solid in the liquid to the device in which the liquid is separated from the solid, the solid and liquid are discharged together continuously from the vessel to a suitable cutting, crushing, or grinding device in which the particle size of the solid is reduced, and are then separated, returning the liquid to the vessel. In this manner the liquid in the vessel is maintained at a substantially constant level sufficient to allow the solid to be discharged with the liquid. Undue dilution of valuable spent liquor is avoided as no additional liquid is needed. Preferably, the mass of liquid and solid in the vessel are agitated to facilitate discharge of the solid.

The process will be explained in more detail with respect to the drawing in which.

Figure 1:
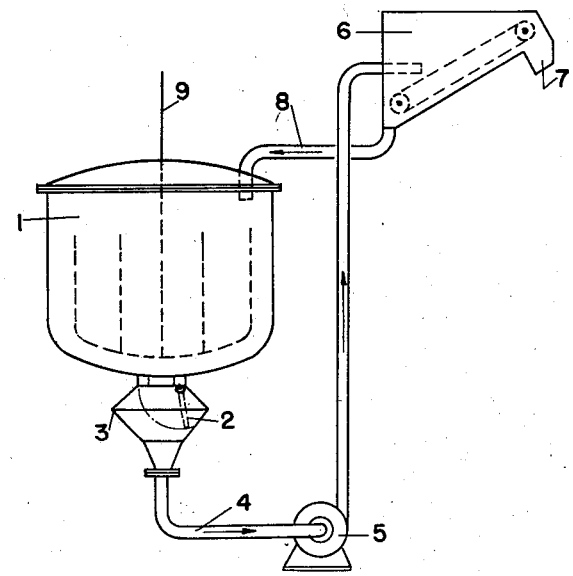
Figure 1 is a schematic representation of a vessel and associated equipment suitable for carrying out the method of this invention.

The equipment of Figure 1 consists of a vessel 1, a closure 2 at the bottom of the vessel, a discharge housing 3, a pipe 4 with a centrifugal pump 5 leading to an endless screen separator 6 with a solids discharge port 7 and a return line 8 leading back to the vessel. The vessel is equipped with an agitator 9. The vessel may be a precipitator, reacting or treating vessel, and may be jacketed and used as an autoclave.

Figure 2:
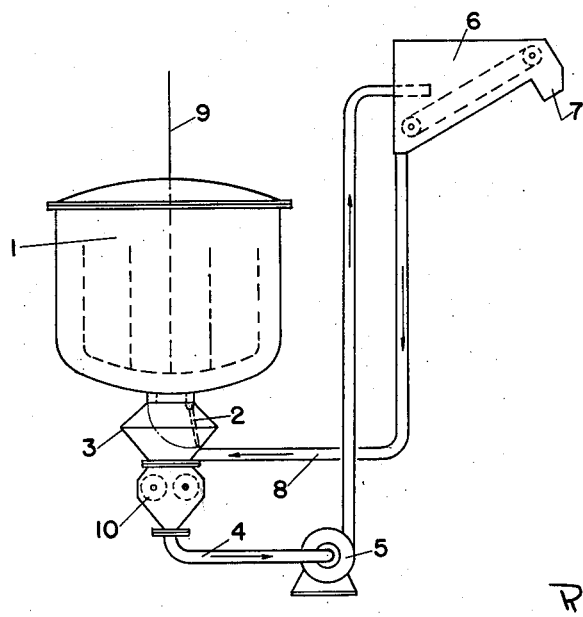
Figure 2 is a schematic representation of a modification of this equipment having in addition a crushing device to be used where relatively large lumps of solid are encountered.

The equipment of Figure 2 is similar but has in addition a power driven roll crusher 10 immediately below the closure 2 and discharge housing 3, and it furthermore illustrates an alternative arrangement of the return line 8 which leads into the lower portion of the discharge housing 3 instead of into the top of the vessel as in the case of Figure 1.

In an example of the operation in accordance with this invention, a mass of solid precipitated cellulose acetate in lump or piece form contained in a relatively small volume of liquid in the vessel 1 of Figure 1 is agitated and continuously discharged through the bottom closure 2 through the discharge section 3 and then into the pipe 4, being pumped by pump 5 to the separator 6. The cellulose acetate is separated and carried by the endless screen to the discharge port 7 while the liquid drains off and is returned by the return line 8 to the vessel. The liquid level is thus maintained substantially constant in the vessel and it is thus impossible for all the liquid to drain out before all the solid is discharged.

If the solid material consists of large, irregular pieces or lumps, the apparatus of Figure 2 is used. The solid and liquid are discharged together from the vessel 1 through the closure 2 and the discharge housing 3 to the crusher 10 which converts the solid into uniform pieces of reduced size more easily handled by the liquid. The solid and liquid are then conveyed through pipe 4 by means of pump 5 to the separator 6. The transportation liquid is preferably returned in this case into the suction line or discharge section 3 directly before the crushing mill according to the arrangement of return line 8 shown in Figure 2, since this arrangement results in better rinsing of the crushing mill.

The velocity of discharge is regulated by changing the opening of the bottom closure, by changing the speed of the agitator and, if a crusher is used as in Figure 2, by changing the speed of the crusher rolls. In this way it is possible to remove the solid material at a uniform rate in spite of the increasing ratio of liquid to solid towards the end of the discharge operation.

The solid material to be discharged may be, as in the examples given hereinbefore, a cellulosic material, such as cellulose acetate precipitated from the acetylation or hydrolysis solution. The material resulting from such a precipitation may consist for example of solid, irregular pieces of cellulose acetate ranging considerably in size and having an order of magnitude of about 10 cm. on the average, and a valuable concomitant liquid in the ratio of about 1 volume of free liquid to one volume of solid. Alternatively, the solid may be any other precipitated cellulose derivative, such as ethyl cellulose, benzyl cellulose, cellulose propionate, cellulose butyrate, cellulose acetopropionate, cellulose acetobutyrate, cellulose acetostearate, cellulose acetonitrate, and so forth mixed with the liquid resulting from the precipitation. Other solids of generally similar physical properties mixed with a relatively small quantity of a liquid may be similarly treated. Such a mixture is readily handled according to this invention in the apparatus of Figure 2. The present process makes it possible to empty the vessel in which the precipitation, for example, may have taken place completely in a fraction of the time required heretofore for discharge by hand.

It will be understood that the equipment shown in Figures 1 and 2 may be varied considerably within the spirit of this invention. For example, the vessel may be a reaction or treating vessel, autoclave, precipitator, and so forth. The liquid and solid may be lead, for example, by gravity to the separator and the return liquid be pumped back to the vessel. The pump, although preferably a centrifugal pump may be any pump suitable for handling the mixture. The separator may be a drum screen, shaking trough, screen band, rotary or other filter, etc. The size reducing device 10 of Figure 2 may be any cutting, crushing, or grinding mill suitable for reducing the particle size of the solid.

It will be understood that the details and examples hereinbefore set forth are illustrative only, and that the invention as broadly described and claimed is in no way limited thereby.

What we claim and desire to protect by Letters Patent is:

1. A method for the recovery of pieces or lumps of solid, precipitated cellulose organic ester from a precipitation vessel in which they are associated with a relatively small volume of valuable, non-solvent liquid containing a solvent and a non-solvent for the ester which comprises continuously flowing a suspension of the precipitated cellulose ester in the said liquid from the lower portion of the vessel to and between rotating crushing rolls whereby large lumps of ester in the liquid are reduced, further flowing the suspension to a separator, therein continuously straining the ester from the liquid, and continuously returning the strained liquid to the vessel to maintain the liquid therein substantially constant and sufficient to allow the precipitated ester in the vessel to be discharged with the liquid.

2. A method for the recovery of pieces or lumps of solid, precipitated cellulose organic ester from a precipitation vessel in which they are associated with a relatively small volume of valuable, non-solvent liquid containing a solvent and a non-solvent for the ester which comprises continuously flowing a suspension of the precipitated cellulose ester in the said liquid through an enclosed conduit leading from the lower portion of the vessel to and between rotating crushing rolls whereby large lumps of ester in the liquid are reduced, further flowing the suspension to a separator, therein continuously straining the ester from the liquid, and continuously returning the strained liquid from the separator in a closed conduit to the conduit leading from the lower portion of the vessel to maintain the liquid in the vessel substantially constant and sufficient to allow precipitated ester in the vessel to be discharged with the liquid.

3. A cellulose ester precipitation and recovery system, characterized by ready recovery of precipitated ester from the system, comprising a vessel with bottom opening and adjustable bottom closure, an agitator adapted to operate substantially throughout the lower and major portion of the vessel, a discharge conduit connected to the vessel at its bottom opening, a roll crusher below the discharge conduit, an endless screen separator for separating precipitated cellulose ester lumps from the concomitant liquid, a second conduit for conveying precipitated cellulose lumps mixed with suspending liquid therefor connecting the roll crusher to the separator, a third conduit connecting the separator to the vessel for returning separated liquid, and a pump in one of the latter two conduits to raise the liquid to permit said return.

4. A cellulose ester precipitation and recovery system, characterized by ready recovery of precipitated ester from the system, comprising a vessel with bottom opening and adjustable bottom closure, an agitator adapted to operate substantially throughout the lower and major portion of the vessel, a discharge conduit connected to the vessel at its bottom opening, a roll crusher below the discharge conduit, an endless screen separator for separating precipitated cellulose ester lumps from the concomitant liquid, a second conduit for conveying precipitated cellulose lumps mixed with suspending liquid therefor connecting the roll crusher to the separator, a third conduit connecting the separator to the discharge conduit for returning separated liquid, and a pump in one of the said second and third conduits to raise the liquid to permit said return.

5. A method for the recovery of pieces or lumps of solid, precipitated cellulose organic ester from a precipitation vessel in which they are associated with a relatively small volume of valuable, non-solvent liquid containing a solvent and a non-solvent for the ester which comprises continuously agitating the precipitated cellulose ester and the said liquid in the vessel and flowing the resulting suspension from the lower portion of the vessel to and between rotating crushing rolls whereby large lumps of ester in the liquid are reduced, further flowing the suspension to a separator, therein continuously straining the ester from the liquid, and continuously returning the strained liquid to the vessel to maintain the liquid therein substantially constant and sufficient to allow the precipitated ester in the vessel to be discharged with the liquid.

6. A method for the recovery of pieces or lumps of solid, precipitated cellulose organic ester from a precipitation vessel in which they are associated with a relatively small volume of valuable, non-solvent liquid containing a solvent and a non-solvent for the ester which comprises continuously agitating the precipitated cellulose ester and the said liquid in the vessel and flowing the resulting suspension of the precipitated cellulose ester in the said liquid through an enclosed conduit, leading from the lower portion of the vessel, to and between rotating crushing rolls whereby large lumps of ester in the liquid are reduced, further flowing the suspension to a separator, therein continuously straining the ester from the liquid, and continuously returning the strained liquid from the separator in a closed conduit to the conduit leading from the lower portion of the vessel to maintain the liquid in the vessel substantially constant and sufficient to allow precipitated ester in the vessel to be discharged with the liquid.

RUDOLF HOFMANN.
HANS MANK.